Nov. 24, 1936.  J. L. LOEHNIS ET AL  2,062,184
EMERGENCY SAFETY BRAKE
Original Filed April 16, 1929

INVENTORS
Wesley I. Williams &
John L. Loehnis.
BY
ATTORNEY.

Patented Nov. 24, 1936

2,062,184

UNITED STATES PATENT OFFICE 2,062,184

EMERGENCY SAFETY BRAKE

John L. Loehnis, Long Beach, and Wesley I. Williams, Wilmington, Calif.

Refiled for abandoned application Serial No. 355,442, April 16, 1929. This application April 20, 1936, Serial No. 75,428

2 Claims. (Cl. 188—36)

This is a new application filed in place of our abandoned application, Ser. No. 355,442, filed April 16, 1929 for Emergency safety brake.

This invention relates to an emergency safety brake appliance whereby the wheels of a conveyance such as street cars, railroad cars, and the like, are effectively stopped, particularly upon a slippery or inclined track.

An object of our invention is to provide an emergency safety brake which can be quickly and easily placed under the wheels of the conveyance to bring said conveyance to a quick stop.

A further object is to provide a brake of the character stated which is simple in construction and effective in operation.

Other objects, advantages, and features of invention may appear from the accompanying drawing, the subjoined detailed description, and the appended claims.

In the drawing—

Figure 1:
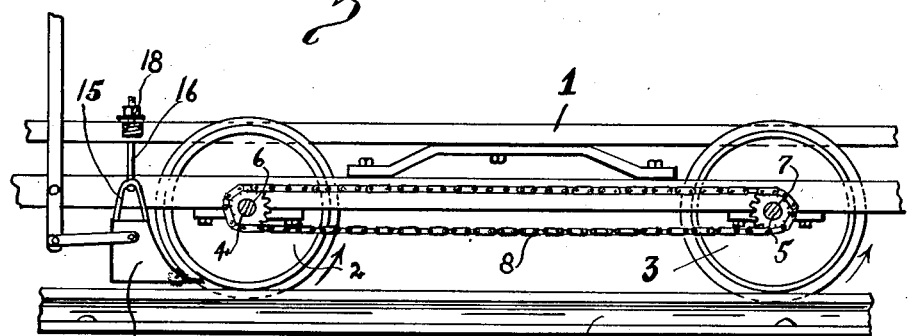
Figure 1 is a side elevation of our safety brake shown in position on the trucks of a conveyance.

Referring more particularly to the drawing, the numeral 1 indicates the truck structure of a conveyance upon which the front and rear sets of wheels 2, 3 are journaled. The sets of wheels 2, 3 are mounted upon shafts 4, 5, respectively, and sprocket wheels 6, 7 are secured to the shafts 4, 5, respectively. A chain 8 encircles the sprockets 6, 7, the purpose of this chain being to communicate the braking action on the front wheels to the rear set of wheels, as will be further described. The wheels 2, 3 travel upon the rails 9, all of which is usual and well known in this type of construction.

The braking shoe 10 is suspended forwardly of the wheel 2 and this shoe is adapted to move forwardly or rearwardly, as will be further described. The rear face of the shoe 10 is arcuate, as shown at 11, so that it will fit the periphery of the wheel 2. The lower face of the shoe 10 is a plane horizontal surface, as shown at 12, so that it may rest upon the rail 9.

A serrated or toothed roller 13 is journaled in an opening 14 in the shoe 10, this roller being adapted to bear against both the periphery of the wheel and the upper surface of the rail 9. This serrated roller acts as an idler gear between the wheel and the rail and tends to move the wheel in a reverse direction to its normal forward rotation. Thus, a very effective braking action is had upon the wheel.

A strap 15 rises from the shoe 10 and a bar 16 extends thru the strap and thru the truck frame structure 1. A spring 17 bears against a nut 18 on the top of the bar 16. The purpose of this spring is to hold the shoe up out of contact with the rail 9 when the shoe is not in braking position. This latter arrangement is shown in Fig. 1.

Figure 2:
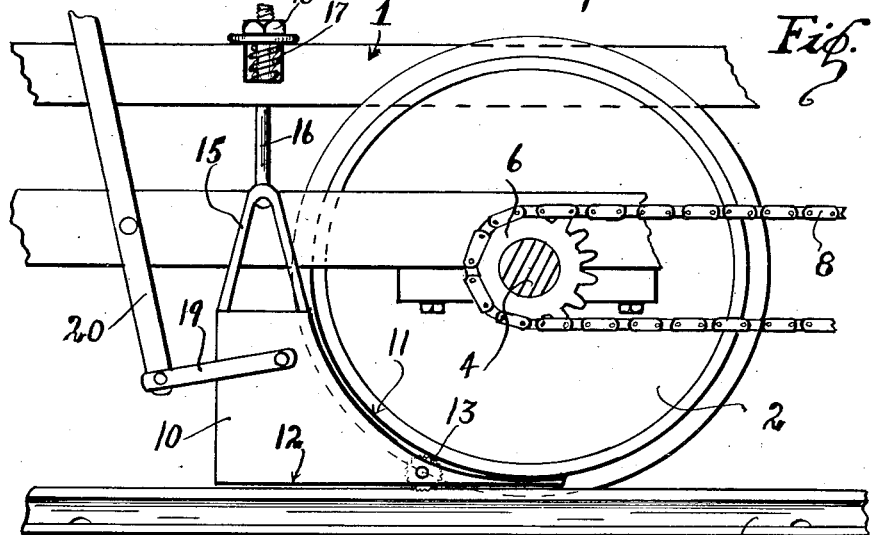
Figure 2 is an enlarged fragmentary side elevation of our safety brake in position on the truck of a conveyance.
Figure 3:
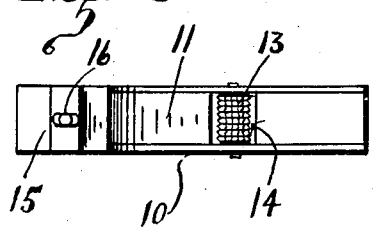
Figure 3 is a plan view of the shoe.

The shoe 10 is moved rearwardly into contact with the wheel 2 by any suitable manual or mechanical means, the means here shown consisting of a link 19 which is pivotally secured to the shoe 10 and to a lever 20 which is pivotally mounted upon the frame 1. The lever 20 may be either manually or mechanically moved to swing the shoe 10 under the wheel 2 into the position shown in Fig. 2.

Having described our invention, we claim:

1. An emergency brake appliance for rail conveyances including a truck frame, wheels journaled on the truck, and rails upon which the wheels travel, said appliance comprising a shoe, an arcuate surface on the shoe adapted to be positioned adjacent the wheel in the operative position of the brake appliance, a rod secured to the shoe and extending thru the truck frame, a nut on said rod, a spring between said nut and the truck frame, a lever pivotally mounted on the frame, a link pivoted to the lever and the shoe whereby said shoe is moved into engagement with the wheel and track, and a toothed roller journaled on the shoe, said roller being adapted to contact with the wheel and rail, and the bottom surface of said shoe being on the rail when the brake appliance is operating.

2. An emergency safety brake appliance for rail conveyances including a truck frame, wheels journaled on the truck and rails upon which the wheels travel, said appliance comprising a shoe, an arcuate surface on the shoe adapted to be positioned adjacent the wheel in the operative position of the brake appliance, a strap rising from the shoe, a rod extending thru the strap and thru the frame, a spring engaging the rod and urging the same upwardly whereby the shoe is raised above the rail, a toothed roller journaled in the shoe and adapted to engage both the wheel and rail, and means whereby the shoe is moved into engagement with the wheel, and the bottom surface of said shoe being on the rail when the brake appliance is operating.

JOHN L. LOEHNIS.
WESLEY I. WILLIAMS.